United States Patent [19]

Groh et al.

[11] Patent Number: 5,281,820
[45] Date of Patent: Jan. 25, 1994

[54] RADIATION DETECTOR

[75] Inventors: Werner Groh, Lich; Jochen Coutandin, Langenlonsheim; Peter Herbrechtsmeier, Konigstein/Taunus; Jurgen Theis, Frankfurt am Main; Thomas Stehlin, Hofheim, all of Fed. Rep. of Germany

[73] Assignee: Hoechst Aktiengesellschaft, Fed. Rep. of Germany

[21] Appl. No.: 725,577

[22] Filed: Jul. 3, 1991

Related U.S. Application Data

[63] Continuation-in-part of Ser. No. 445,397, Dec. 5, 1989, abandoned.

[30] Foreign Application Priority Data

Jul. 12, 1988 [DE] Fed. Rep. of Germany ....... 3841136

[51] Int. Cl.$^5$ .......................... G01T 1/20; G01T 1/203
[52] U.S. Cl. ................................. 250/368; 250/361 R; 250/483.1; 250/486.1
[58] Field of Search ............... 250/367, 368, 361, 458, 250/483.1, 486.1, 370.11

[56] References Cited

U.S. PATENT DOCUMENTS

| | | | |
|---|---|---|---|
| 3,790,785 | 2/1974 | Paulini et al. | 250/368 X |
| 4,259,579 | 3/1981 | Geary | 250/368 |
| 4,317,037 | 2/1982 | Suzuki et al. | 250/367 |
| 4,413,184 | 11/1983 | Marrone | 250/368 |
| 4,437,007 | 3/1984 | Koslow et al. | 250/367 X |
| 4,739,168 | 4/1988 | Aoki | 250/368 |
| 4,788,436 | 11/1988 | Koechner | 250/368 X |
| 4,829,185 | 5/1989 | Cerff | 250/368 X |
| 5,103,099 | 4/1992 | Bourdinaud et al. | 250/368 |

FOREIGN PATENT DOCUMENTS

| | | | |
|---|---|---|---|
| 2149193 | 6/1985 | European Pat. Off. | 250/368 |
| 63-139277 | 6/1988 | Japan | 250/368 |
| 1326880 | 7/1987 | U.S.S.R. | 250/368 |

OTHER PUBLICATIONS

Eckardt et al, "A Novel Light Collecting System for Segmented Scintillation. Counter Calorimeters", Nucl. Inst. & Methods, 155, No. 3 1978 pp. 389-398.

Primary Examiner—Constantine Hannaher
Assistant Examiner—Edward J. Glick
Attorney, Agent, or Firm—Connolly & Hutz

[57] ABSTRACT

A detector for detecting invisible radiation and charged particles is composed of at least one radiation-absorbing panel and at least one optical waveguide arranged parallel to the surface of said panel and containing a fluorescent dyestuff. The luminescent light produced in the panel by the absorbed radiation is converted into a fluorescent radiation in the optical waveguide conducted to a photosensitive semiconductor component by total reflection and measured at that point.

10 Claims, 9 Drawing Sheets

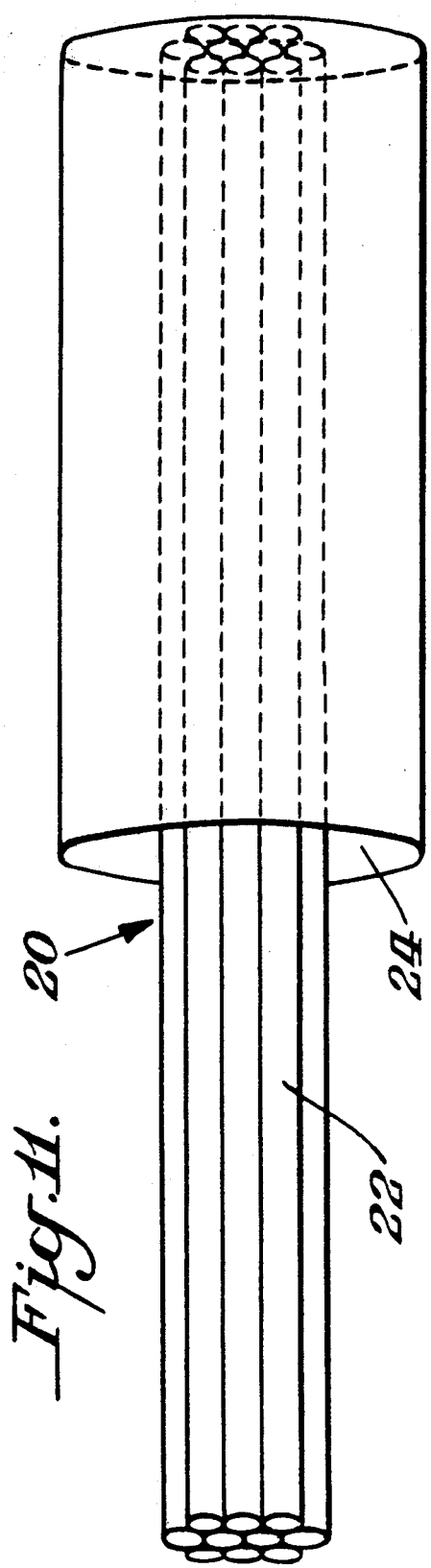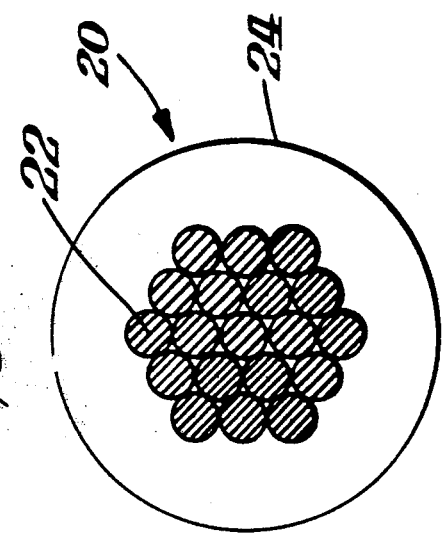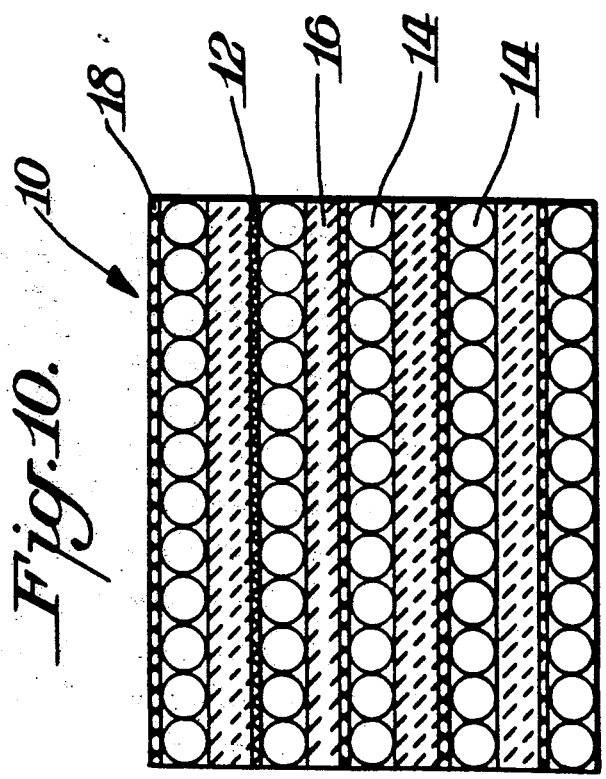

RADIATION DETECTOR

Cross-Reference to Related Application

The present application is a continuation-in-part of U.S. application Ser. No. 445,397, filed Dec. 5, 1989, now abandoned.

BACKGROUND OF THE INVENTION

The present invention relates to a detector for detecting invisible radiation and charged particles.

It is known that if light is irradiated laterally into an optical waveguide containing fluorescent dyestuffs, fluorescent radiation is produced which can be conducted to the end faces of the optical waveguide by total reflection (cf. Tanaka et. al., SPIE, vol. 840, "Fiber Optic Systems for Mobile Platforms", page 19).

It is further known that polymer optical waveguides doped with a scintillating compound can be used to detect γ-radiation and charged particles (cf. H. Blumenfeld et. al., Nucl. Instr. Meth. A257 (1987), 603). A disadvantage of this method, however, is that the sensitive surface is restricted to geometries which can be produced from such fibers. Thus, it is not readily possible, for example, to achieve the frequently used, circular, sensitive surface.

It has also already been proposed to produce a light detector from a plate-like light-absorbing body and at least one optical waveguide connected thereto (cf. German Patent application Ser. No. 3,832,803 or equivalent U.S. Pat. No. 5,132,530.

SUMMARY OF THE INVENTION

One object was to find a detector for invisible radiation and charged particles which is distinguished by simplicity and flexible design possibilities.

It was found that this object can be achieved if at least one optical waveguide containing a fluorescent dyestuff is arranged parallel to the surface of a radiation-absorbing panel.

The radiation-absorbing panel may have any desired form, preferably it is rectangular or round, in particular rectangular. The thickness is 0.1 to 3 mm, preferably 0.3 to 1 mm. The panel is composed of a carrier material, for example a polymer, doped with a luminescent compound. Such panels may, for example, be the commercially available fluoroscopic screens (x-ray absorbing screens).

Arranged parallel to the surface of the panel is at least one optical waveguide. Preferably, the optical waveguide is bonded to the surface. A single optical waveguide may also be replaced by a bundle of optical waveguides and the optical waveguide or waveguides may also be arranged between two panels so that the whole has a sandwich structure.

The optical waveguide may be a commercial fiber which is preferably composed of a transparent polymer, for example polycarbonate, polystyrene or polymethyl methacrylate in the core and a polymer cladding having a lower refractive index, for example a fluorinated acrylate. The core of the optical waveguide may also be formed of glass, for example $SiO_2$ or other glasses. In that case the cladding material is a transparent polymer, having a lower refractive index than the glass.

The optical waveguide contains at least one fluorescent dyestuff, it being essential for the wavelength range of the luminescent radiation from the panel to overlap with the wavelength range of the absorption of the optical waveguide dyestuff. In the optical waveguide, the dyestuff may be contained in the core or in the cladding or in both. Suitable fluorescent dyestuffs are, in particular, organic compounds, for example perylene dyestuffs, benzoxanthenes, or, alternatively, inorganic compounds.

If radiation of suitable wavelength, for example X-ray radiation, impinges upon the panel, luminescent light, which impinges with high intensity on the optical fiber, is emitted in the panel. If the matching of the dyestuff in the fiber is such that the spectral emission range of the scintillator corresponds to the spectral absorption range of the optical fiber dyestuff, the light from the panel produces fluorescent radiation in the optical waveguide which is conveyed by total reflection and emerges at the end of the optical wave guide. At that point there is a photosensitive semiconductor component, for example a silicon diode, which detects the radiation. The diode may be of small area and therefore of the low-noise type.

In order to avoid any interfering irradiation of the optical waveguide with extraneous radiation, it can be surrounded with a light absorbing layer, for example a black polymer sheet or a black metal foil, on the side facing away from the panel. Transparent layers, for instance transparent glue or resin layers, for protection against mechanical or chemical stress or for checking the total reflection may be deposited on the panel or on the optical waveguide. In order to transmit the optical signal over a fairly large distance to the semiconductor component, lower-attenuation optical waveguides composed of polymer or glass may be arranged at the end of the fluorescent optical waveguide.

Another embodiment of the present invention is a detector including one or more radiation absorbing panels arranged parallel to one another. One or more optical waveguides are positioned between the parallel panels. In between the panels and waveguides metal sheets may be arranged, so that a multilayer structure results. The metal sheets are composed of metals having a high atomic number greater than 25, for instance iron, copper or zinc, preferably greater than 40, for instance zirconium, palladium, silver or cadmium, especially preferred greater than 73, for instance platinum, gold or lead. The thickness of the metal sheet is dependent on the energies employed.

Possible multilayer structures may comprise:

$$a. - \ldots p - wg - p - ms - p - wg - p - ms - p \ldots$$

$$b. - \ldots p - wg - ms - wg - p - wg - ms - wg - p \ldots$$

$$c. - \ldots p - wg - ms - p - wg - ms - p \ldots$$

where p=panel, wg=waveguide, and ms=metal sheet.

With this arrangement it is possible to determine x-ray and γ-energies by absorption processes in the metal sheet and thereby to measure intensity ratios.

BRIEF DESCRIPTION OF THE DRAWINGS

Novel features and advantages of the present invention in addition to those noted above will become apparent to those skilled in the art from a reading of the following detailed description in conjunction with the accompanying drawings wherein similar reference characters refer to similar parts in which:

FIG. 10 is a cross-sectional view of another detector according to the present invention illustrating a multilayer structure;

FIG. 11 is a perspective view of still another detector according to the present invention illustrating a cylindrical geometry; and FIG. 12 is a cross-sectional view of the detector shown in FIG. 11.

DETAILED DESCRIPTION OF THE INVENTION

Advantages of the detector according to the invention are:

Very large sensitive surface is possible which, in addition, can be shaped in any desired manner by suitable masking. Irradiation-impermeable metal foils or adhesive films, for example, may be used for masking.

Purely optical operation, i.e. no electrical leads as well as no high electric voltage are necessary at the site of the radiation detection. Use is therefore also possible in areas with an explosion hazard.

No, or only slight, alignment effort due to large detector surface.

Radiation detection possible from both sides of the panel.

The spectral sensitivity of the detector is selective in the absorption range of the scintillator in the panel and may be matched to the measurement problem by choice of this scientillator.

The luminescence quantum yield for electrons, protons, γ-quanta or X-ray quanta can be optimized in different energy ranges by suitable choice of the fluoroscopic screen material or scintillator.

The nature and the concentration of the scintillating material can be chosen dependent on the application of the detector.

EXAMPLE 1

Figure 1:
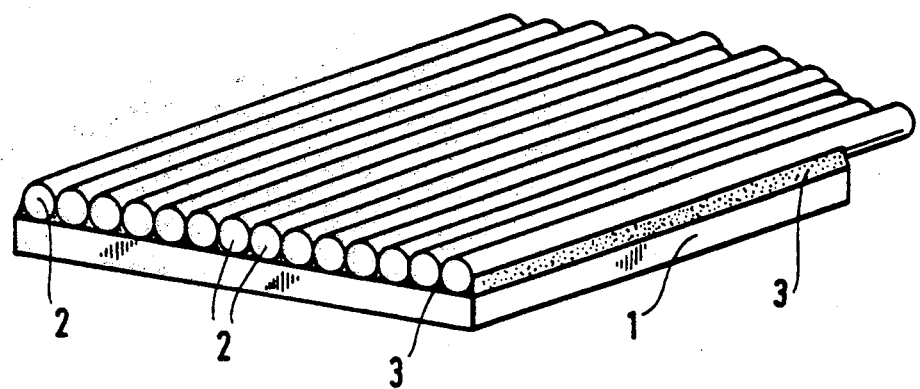
FIG. 1 shows a detector in which a radiation-absorbing panel (1) is joined to a bundle of optical waveguides (2) arrange in parallel by the adhesive layer (3)
Figure 2:
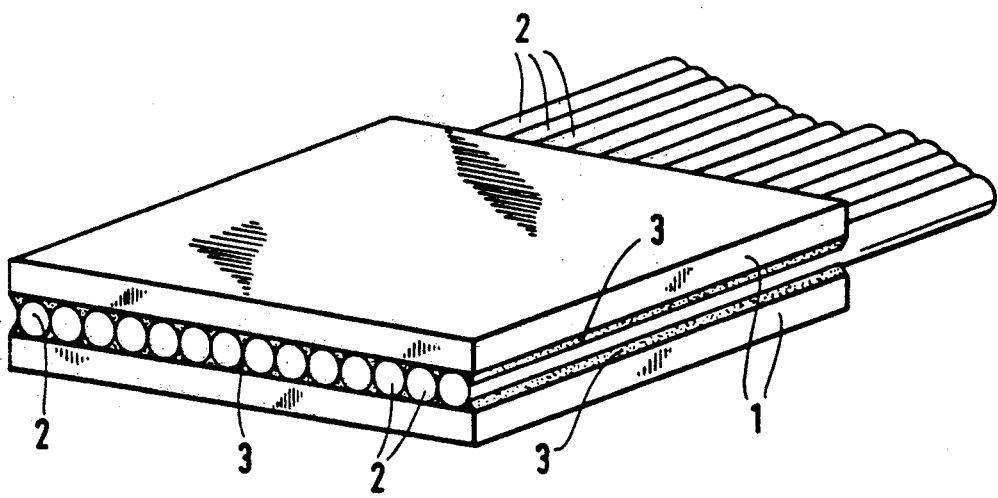
FIG. 2 shows a detector in which two panels (1) enclose the optical waveguides (2). The joint is again achieved by the adhesive layer (3)

The core of a polymer optical waveguide having a polycarbonate core and poly(4-methyl-1-pentene) cladding was doped with a perylene dyestuff which absorbs in the 520–580 nm wavelength range. The fiber diameter was 1 mm. Nine optical waveguides each 15 cm long were arranged parallel to a strip and covered by two panels, each 1 cm×2 cm in size, at one fiber end (FIG. 2). The panels are obtainable commercially as X-ray fluoroscopic screens and are composed of a (Zn, Cd)S:Ag pigment whose emission wavelength of 540 nm is in the absorption range of the optical waveguide dyestuff. Panels and fibers were bonded to one another and enclosed with a black thin-walled shrink-down tube for protection against outside influences. At the fluoroscopic screen the fiber ends were reflection-coated in order to obtain maximum intensity at the photodiode.

Because of the relatively high attenuation of the fluorescent optical waveguide, it is advisable in the case of fairly long transmission paths to the photodiode to switch to untinted optical waveguides by means of a plug connection.

The table shows the result of a test measurement. The sensitive surface of the detector was exposed to an X-ray beam. Variation in the cathode current in the X-ray tube resulted in a linear dependence on voltage in the photodiode.

TABLE

| Cathode current [mA] | Detector voltage [V] | |
|---|---|---|
| | 30 kV | 40 kV (tube voltage) |
| 5 | 0.22 | 0.53 |
| 10 | 0.48 | 1.14 |
| 15 | 0.75 | 1.74 |
| 20 | 1.01 | 2.36 |
| 25 | 1.28 | 2.96 |
| 30 | 1.55 | 3.58 |

Experiments have been carried out to determine, in absolute units, the response of the radiation detector as a function of x-ray photon energy. To accomplish this a high intensity, tunable x-ray energy synchrotron source was used. As a result it was found that the radiation detector has a linear response over a wide range of intensities at photon energies from 5 keV to 22.5 keV. The sensitivity was also evaluated as a function of photon energy.

The radiation detector was also compared with more conventional ion chamber detectors in x-ray absorption, namely x-ray absorption fine structure spectroscopy (EXAFS) and x-ray absorption near edge spectroscopy (XANES). The present radiation detector did quite well in producing EXAFS and XANES data.

Overall the response, ease of use, simplicity and compact size of the radiation detector are among its many significant characteristics. X-ray transparent windows and optimized electronics can also be employed to eliminate low energy photon losses and gain in sensitivity.

Synchrotron radiation from the National Synchrotron Light Source (NSLS) at Brookhaven National Laboratory was used as a tunable monochromatic x-ray source to determine the absolute sensitivity of a polymer optical fiber (POF) based x-ray sensor, according to the present invention. The response was determined at photon energies from 5 keV to 22.5 keV. Over this energy range, the POF-based sensor was found to have a linear response to x-rays for a wide range of incident intensities. The sensitivity of the POF-based sensor increases dramatically between 5 and 15 keV, above which it depends more weakly on x-ray photon energy. The shape of the spectral response curve suggests that at low photon energies the sensitivity is limited as a result of x-ray absorption by the cladding over the luminescent screen.

With a radiation detector according to the present invention, x-rays penetrate a black cladding layer (used to exclude visible light) and excite luminescent screens. Fluorescence from the screens is efficiently coupled into fluorescent POF fibers. Light propagates down the POF bundle to a Si photodiode. It is of interest to measure the absolute sensitivity of this device as a function of x-ray photon energy. The X-11A beamline of the NSLS synchrotron facility at Brookhaven National Laboratory is ideally suited for these measurements, since it provides intense, monochromatic x-ray beams with photon energy tunable over a wide range.

The calibration experiments were performed at the X-11A beamline of the NSLS synchrotron facility at Brookhaven National Laboratory. The storage ring operated at 2.5 GeV, with current between 220 and 205 mA. The double crystal, channel-cut Si(111) monochromator was detuned ($I_o$ reduced by at least 20%) to reduce the intensity of harmonics in the beam. Measurements were performed at photon energies from 5 keV to 22.5 keV, limits imposed by the crystals used in the monochromator. The intensity of x-rays incident on the POF-based sensor was varied by attenuating the x-ray beam, in front of the ion chamber detector, with various thicknesses of Al foil. See Table 1.

TABLE 1

Raw Data for Sensitivity Calibration of POF-based X-ray Detector

| X-ray Energy | Ion Chamber Current | Detector Voltage | Log Gain | Ion Chamber Gas | Attenuator Thickness |
|---|---|---|---|---|---|
| 5000 eV | 134.6 nA | 21.7 mV | 7 | Nitrogen | none |
| " | 99.2 | 18.0 | " | " | 6.4 μm |
| " | 72.7 | 15.0 | " | " | 12.8 |
| " | 39.2 | 11.3 | " | " | 25.6 |
| " | 15.4 | 8.5 | " | " | 45.0 |
| " | 4.6 | 7.6 | " | " | 70.0 |
| 7500 eV | 32.1 nA | 248. mV | 7 | Nitrogen | none |
| " | 26.1 | 200. | " | " | 12.8 μm |
| " | 21.1 | 161. | " | " | 25.6 |
| " | 15.7 | 118. | " | " | 45.0 |
| " | 10.3 | 76. | " | " | 70.0 |
| " | 2.6 | 17. | " | " | 150. |
| 10000 | 5.99 nA | 213. mV | 7 | Nitrogen | none |
| " | 5.00 | 175. | " | " | 25.6 μm |
| " | 3.69 | 128. | " | " | 70.0 |
| " | 2.02 | 68. | " | " | 150. |
| " | 0.69 | 21. | " | " | 300. |
| 12500 eV | 52.5 nA | 649. mV | 6 | Nitrogen | none |
| " | 48.0 | 592. | " | " | 25.6 μm |
| " | 38.3 | 470. | " | " | 70.0 |
| " | 30.1 | 370. | " | " | 150. |
| " | 17.3 | 213. | " | " | 300. |
| " | 0.92 | 13. | " | " | 1100. |
| 15000 eV | 23.7 nA | 721. mV | 6 | Nitrogen | none |
| " | 21.3 | 645. | " | " | 45.0 μm |
| " | 16.7 | 505. | " | " | 150. |
| " | 11.9 | 361. | " | " | 300. |
| " | 2.2 | 65. | " | " | 1100. |
| 17500 eV | 12.1 nA | 771. mV | 6 | Nitrogen | none |
| " | 11.0 | 700. | " | " | 70.0 μm |
| " | 9.8 | 625. | " | " | 150. |
| " | 7.9 | 502. | " | " | 300. |
| " | 2.7 | 167. | " | " | 1100. |
| " | 1.3 | 79. | " | " | 1600. |
| 20000 eV | 208 nA | 514. mV | 6 | Argon | none |
| " | 182 | 445. | " | " | 150. μm |
| " | 162 | 389. | " | " | 300. |
| " | 78.4 | 183. | " | " | 1100. |
| " | 48.6 | 111. | " | " | 1600. |
| " | 69.3 | 161. | " | " | none |
| " | 62.3 | 143. | " | " | 150. |
| " | 55.3 | 126. | " | " | 300. |
| " | 28.0 | 62. | " | " | 1100. |
| " | 18.3 | 41. | " | " | 1600. |
| " | 7.0 | 14. | " | " | 2700. |

TABLE 1-continued

Raw Data for Sensitivity Calibration of POF-based X-ray Detector

| X-ray Energy | Ion Chamber Current | Detector Voltage | Log Gain | Ion Chamber Gas | Attenuator Thickness |
|---|---|---|---|---|---|
| 22500 eV | 112 nA | 414. mV | 6 | Argon | none |
| " | 87.8 | 321. | " | " | 300. μm |
| " | 75.4 | 275. | " | " | 450. |
| " | 46.8 | 169. | " | " | 1100. |
| " | 32.5 | 115. | " | " | 1600. |
| " | 12.1 | 41. | " | " | 2700. |

To use the highest amplifier gain settings it was necessary to cover the non-fluorescent POF bundle with more black tape to rigorously exclude ambient light. The amplifier circuit of the POF-based sensor was powered by a bipolar laboratory power supply, +12.5V and −12.5V. The amplified voltage output (see Table 1) of the POF-based detector was measured with a digital multimeter. The POF-based sensor was mounted directly against the exit window of a gas ionization chamber that was used to measure the absolute intensity of the incident x-ray beam. The ion chamber was biased at 300V. At this potential the ion chamber operates with unity amplification, and the absolute rate of x-ray photon absorption in the ion chamber, nABS, is given by:

$$n_{ABS}(photons/s) = (I\ V_{eff})/(1.6 \times 10^{-19}\ E_x)$$

where I is the ion chamber current in amperes, $V_{eff}$ is the effective ion pair production energy in eV, and $E_x$ is the x-ray photon energy in eV. The ion chamber current (see Table 1) was measured with an autoranging picoammeter (Kiethly). Nitrogen and argon, with effective ion pair production energies of 34.6 eV and 26.2 eV respectively, were used as detector gases. From the measured absolute photon absorption rate in the ion chamber and the known transmission of the ion chamber gas, one can calculate the absolute rate of photon transmission through the ion chamber. Neglecting absorption by the tin MYLAR (polyethylenterephthalate) exit window of the ion chamber, the rate of photon impingement on the POF-based sensor is given by:

$$N_{INC}(photons/s) = (n_{ABS}exp(-\mu x)/(1 - exp(-\mu x)))$$

where $\mu$ is the energy dependent absorption coefficient, in cm$^{-1}$, of the ion chamber gas and x is the pathlength (15.24 cm). The values of $\mu$ used in data analysis are presented in Table 2.

TABLE 2

Absorption Coefficients of Ion Chamber Gases as a Function of Energy

| X-ray Energy | μ(Nitrogen) 1/cm | μ(Argon) 1/cm | μ(Air) 1/cm |
|---|---|---|---|
| 5000 eV | 0.040 | — | 0.045 |
| 7500 | 0.011 | — | 0.014 |
| 10000 | 0.0046 | — | 0.0062 |
| 12500 | 0.0024 | — | 0.0035 |
| 15000 | 0.0014 | — | 0.0020 |
| 17500 | 0.0010 | — | 0.0013 |
| 20000 | — | 0.015 | 0.00092 |
| 22500 | — | 0.010 | 0.00065 |

Exposure rate is also commonly reported in units of Roentgen/s. The Roentgen (R) is defined as the quantity of x-rays required to produce one statcoulomb of charge in one cubic centimeter of air at STP (273.15K and 1 atm). The unit Roentgen is equivalent to 2.58·10$^{-4}$. By knowing $\mu(E)$ and $V_{eff}$(33.7 eV) for air, we can convert the ion chamber current measurements, obtained using $N_2$ (or Ar), to equivalent currents in air, $$I_{Air}(Amps)=I_{N_2}[V_{eff}(N_2)/V_{eff}(Air)]\cdot[(1-exp(-\mu_{Air}x))/(1-exp(-\mu_{N_2}x))]$$

and x-ray exposure rate, $\Phi$ is R/s.

$$\Phi(R/s)=[3\times10^9\ I_{Air}/V]\cdot(T/273.15)\cdot(760/P)$$

where V is the interaction volume (2.74 cm$^3$), T is the temperature of the ion chamber gas (296° K.), and P is the pressure of the ion chamber gas (750 Torr).

Calibration curves were obtained by measuring the voltage signal produced by the POF-based sensor as the incident x-ray intensity was varied by inserting Al foil attenuators in front of the gas ionization chamber used to measure the absolute x-ray intensity.

Figure 3:
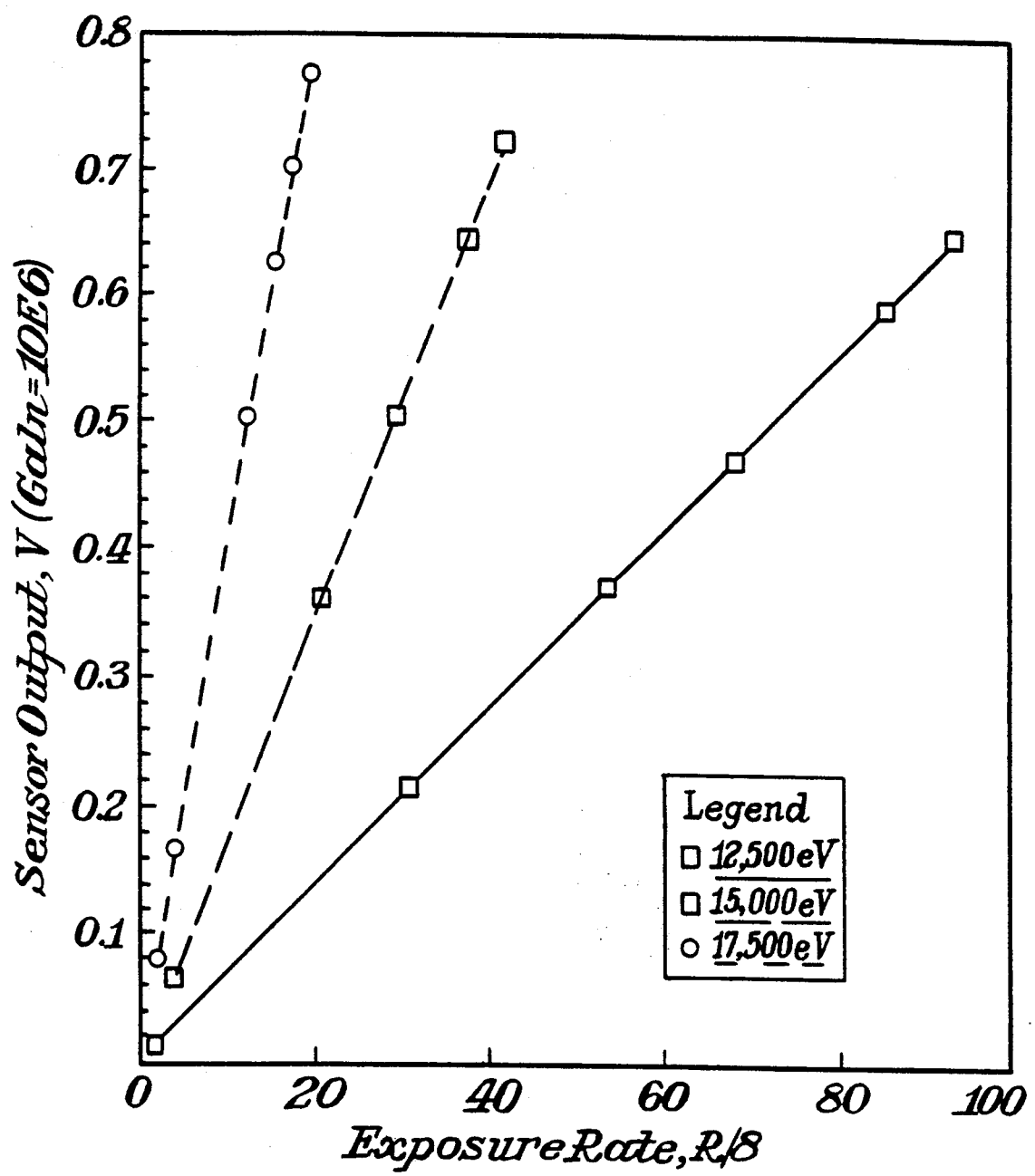
FIG. 3 shows representative calibration plots of the voltage output of a polymer optical fiber (POF) based x-ray sensor as a function of x-ray exposure rate.

FIG. 3 presents representative calibration curves obtained at 12.5, 15.0 and 17.5 keV. The POF-based sensor is clearly linear over a wide range of photon energies and intensities. The sensitivity of the detector at a given energy is given by the slope of the corresponding calibration plot. The slopes were determined by linear least-squares fits to the calibration data. Table 3 presents the absolute sensitivity, expressed in several different units, as a function of photon energy. The sensitivities are "absolute" in the sense that they specify the sensor's voltage output, at a specified amplifier gain setting, to a known intensity of x-rays.

TABLE 3

Absolute Sensitivity of the POF-based Sensor (Gain Setting = 10E7)

| X-ray Energy | Absolute Sensitivity | | |
|---|---|---|---|
| | mVcm$^2$s/photon | mV/$\mu$W | mVs/R |
| 5000 | 3.83E-10 | 2.66 | 0.082 |
| 7500 | 9.07E-9 | 41.9 | 5.10 |
| 10000 | 2.18E-8 | 75.8 | 22.0 |
| 12500 | 4.70E-8 | 130. | 69.1 |
| 15000 | 8.08E-8 | 187. | 173. |
| 17500 | 1.41E-7 | 279. | 401. |
| 20000 | 1.41E-7 | 245. | 390. |
| 22500 | 1.60E-7 | 247. | 572. |

Figure 4:
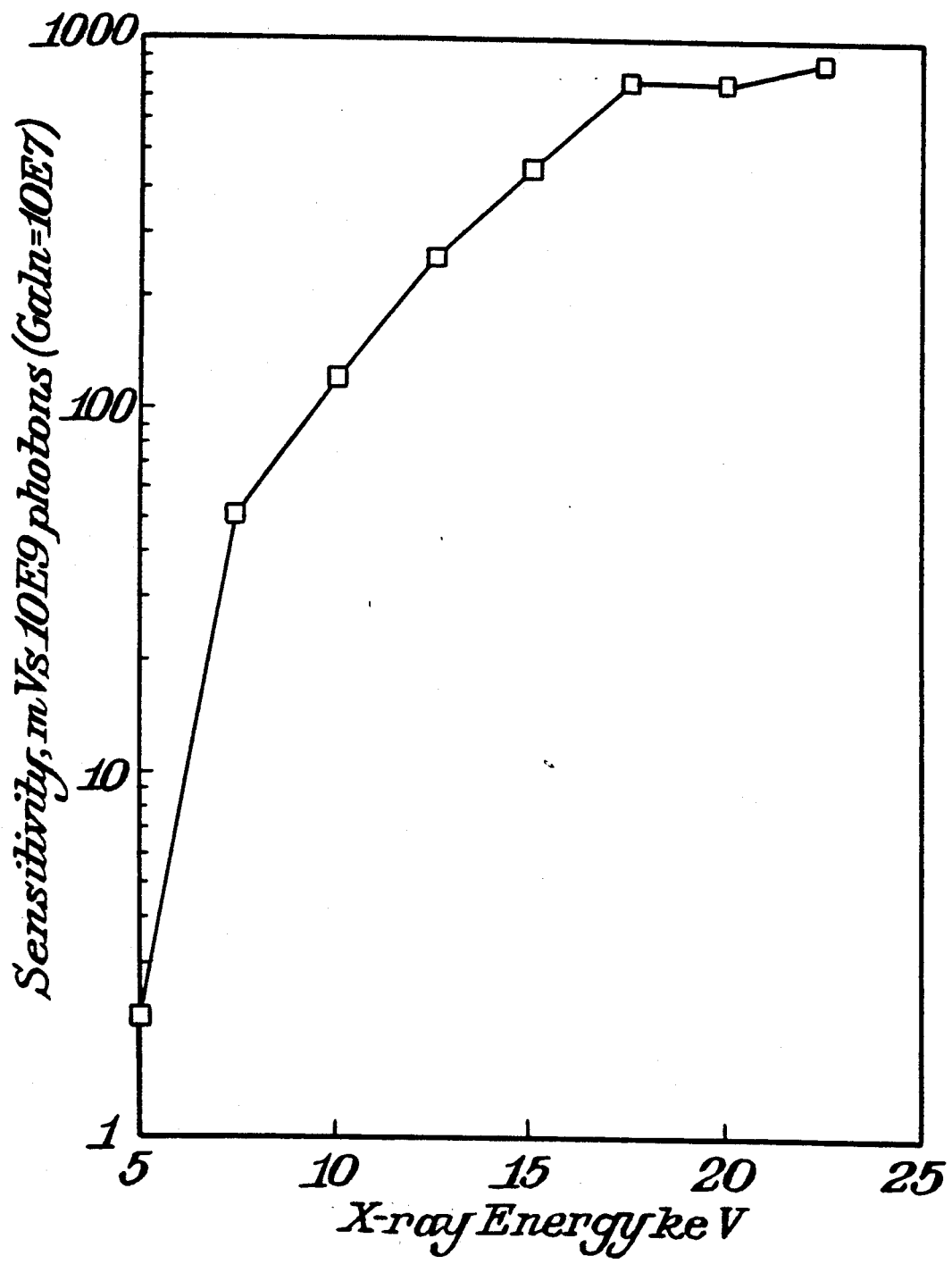
FIG. 4 plots sensitivity, expressed as mVs/$10^9$ photons, as a function of x-ray photon energy.
Figure 5:
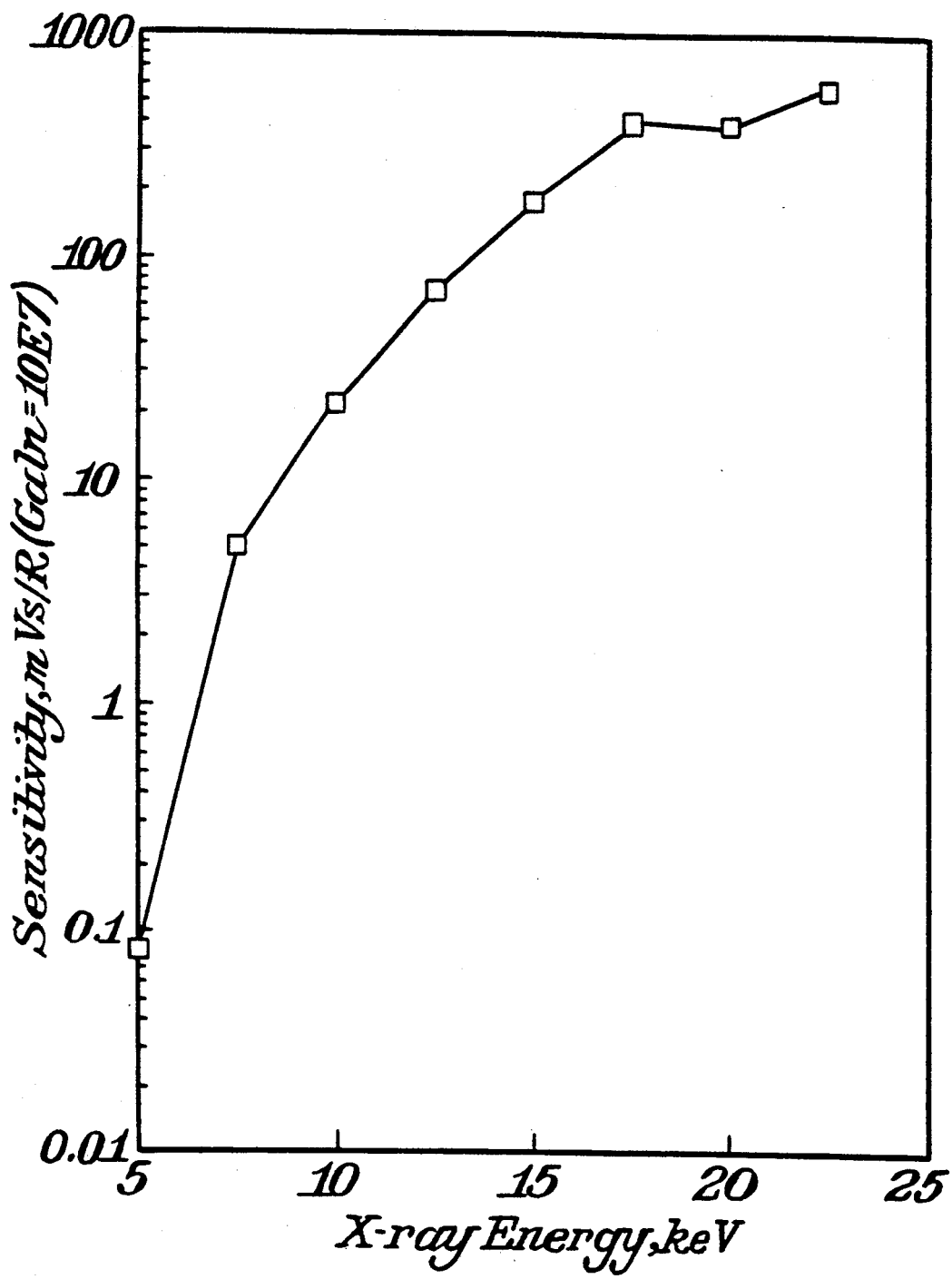
FIG. 5 plots sensitivity, expressed as mVs/R, as a function of x-ray photon energy.
Figure 6:
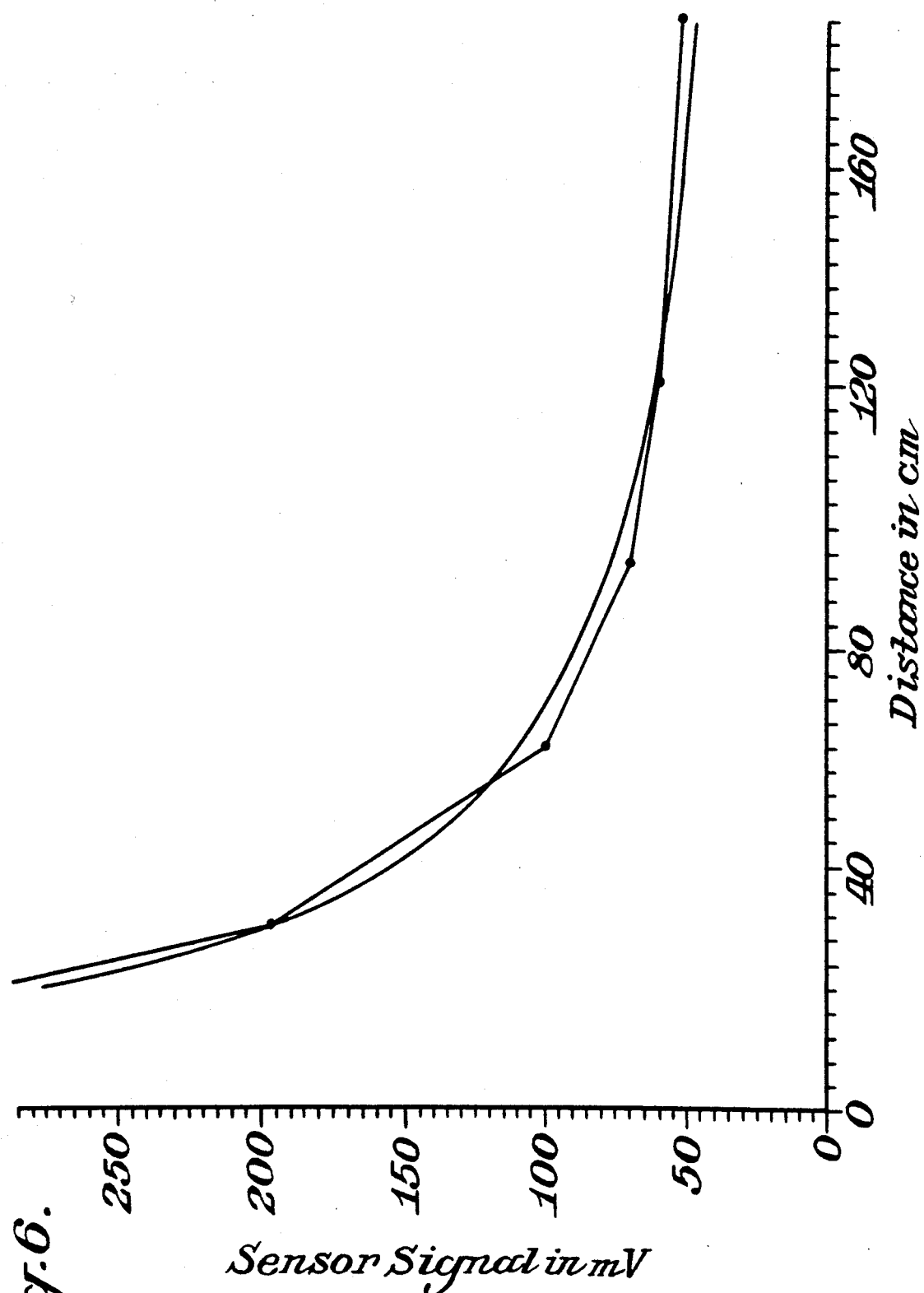
FIG. 6 is a plot of sensor signal in mV versus distance in cm for a sensor with a cylindrical geometry consisting of 2 fibers.
Figure 7:
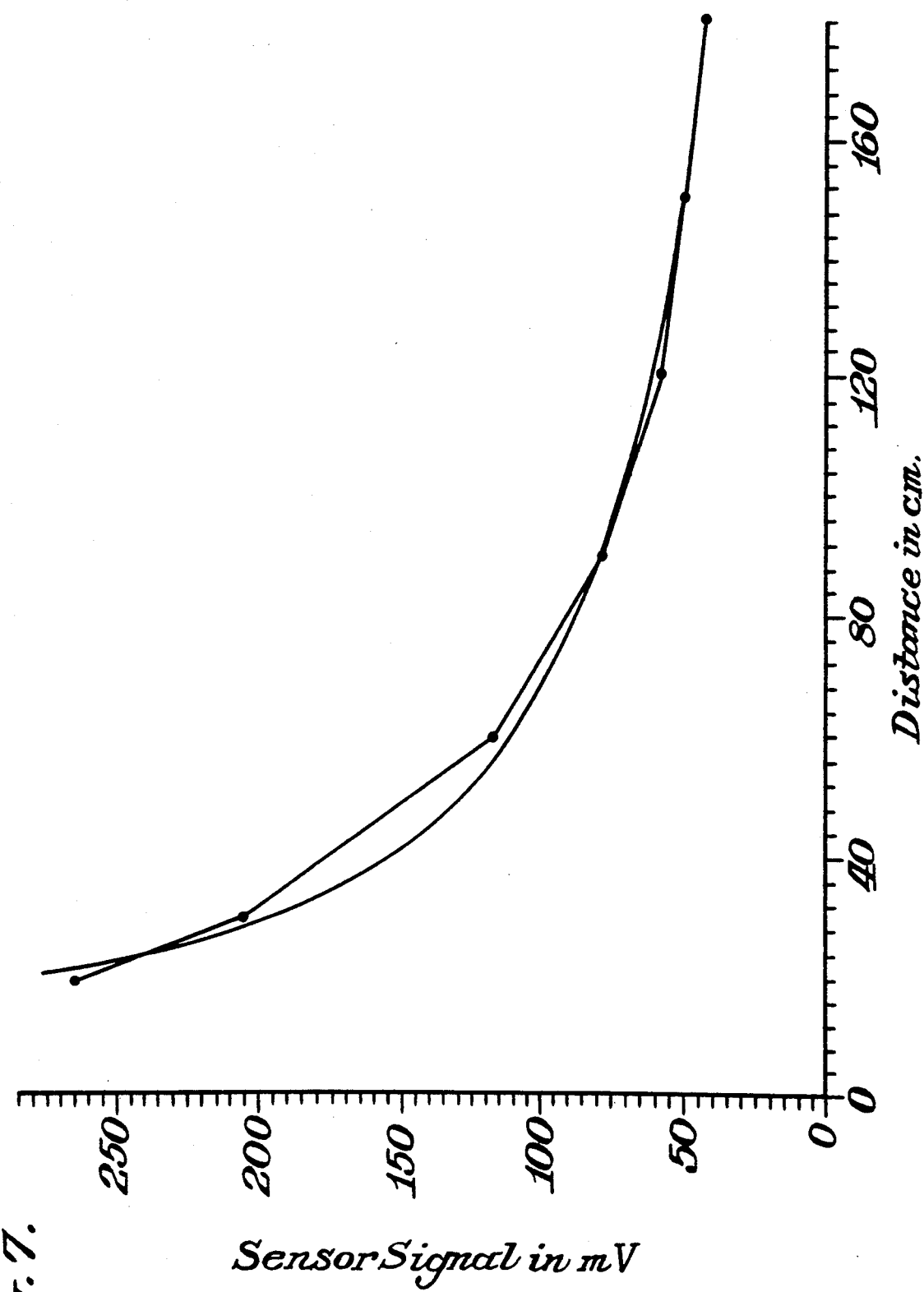
FIG. 7 is a plot of sensor signal in mV versus distance in cm for a sensor with a cylindrical geometry consisting of 20 fibers.
Figure 8:
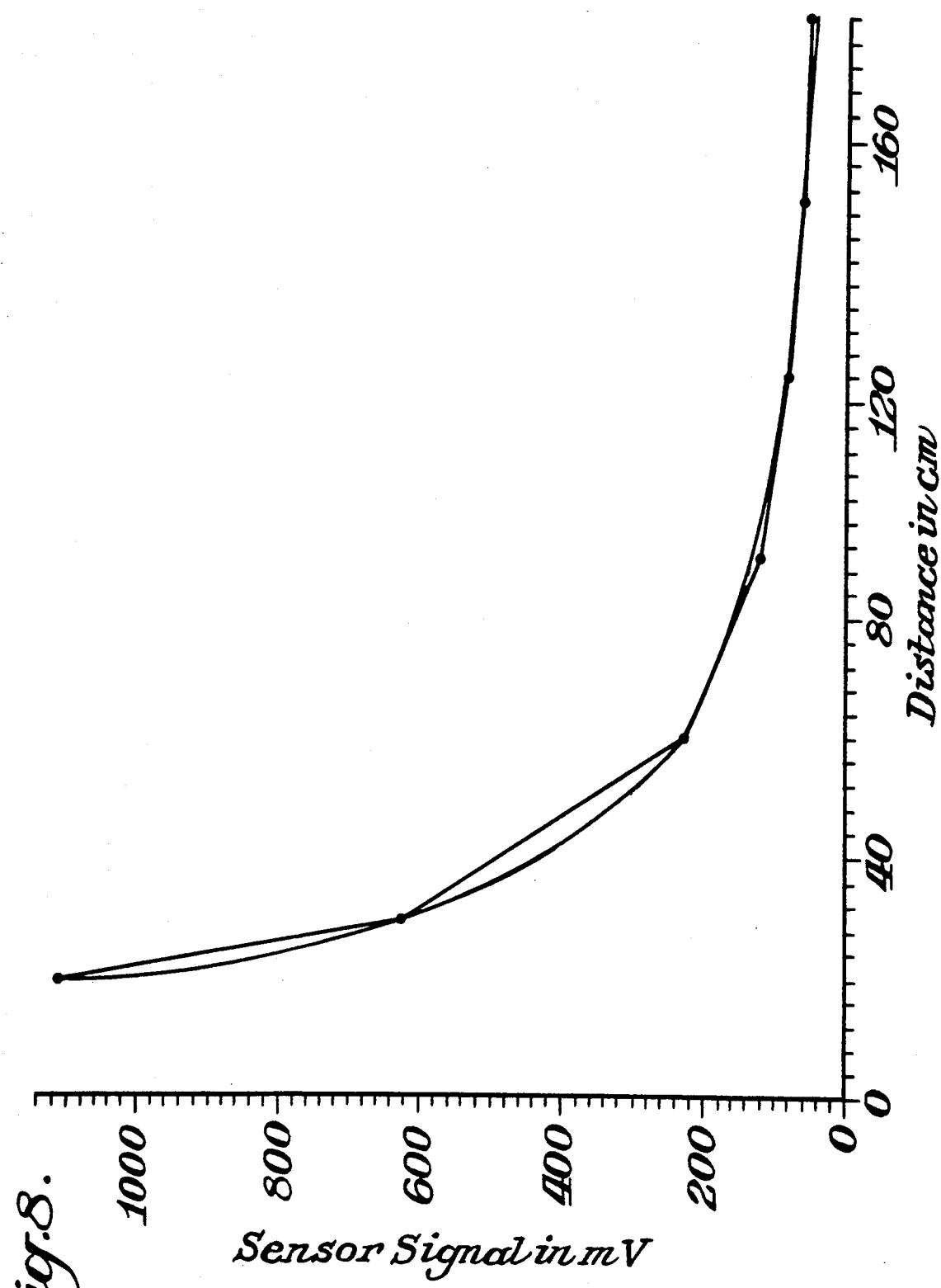
FIG. 8 is a plot of sensor signal in mV versus distance in cm for a sensor with plate-like geometry consisting of plates 2.4 by 2.4 cm.
Figure 9:
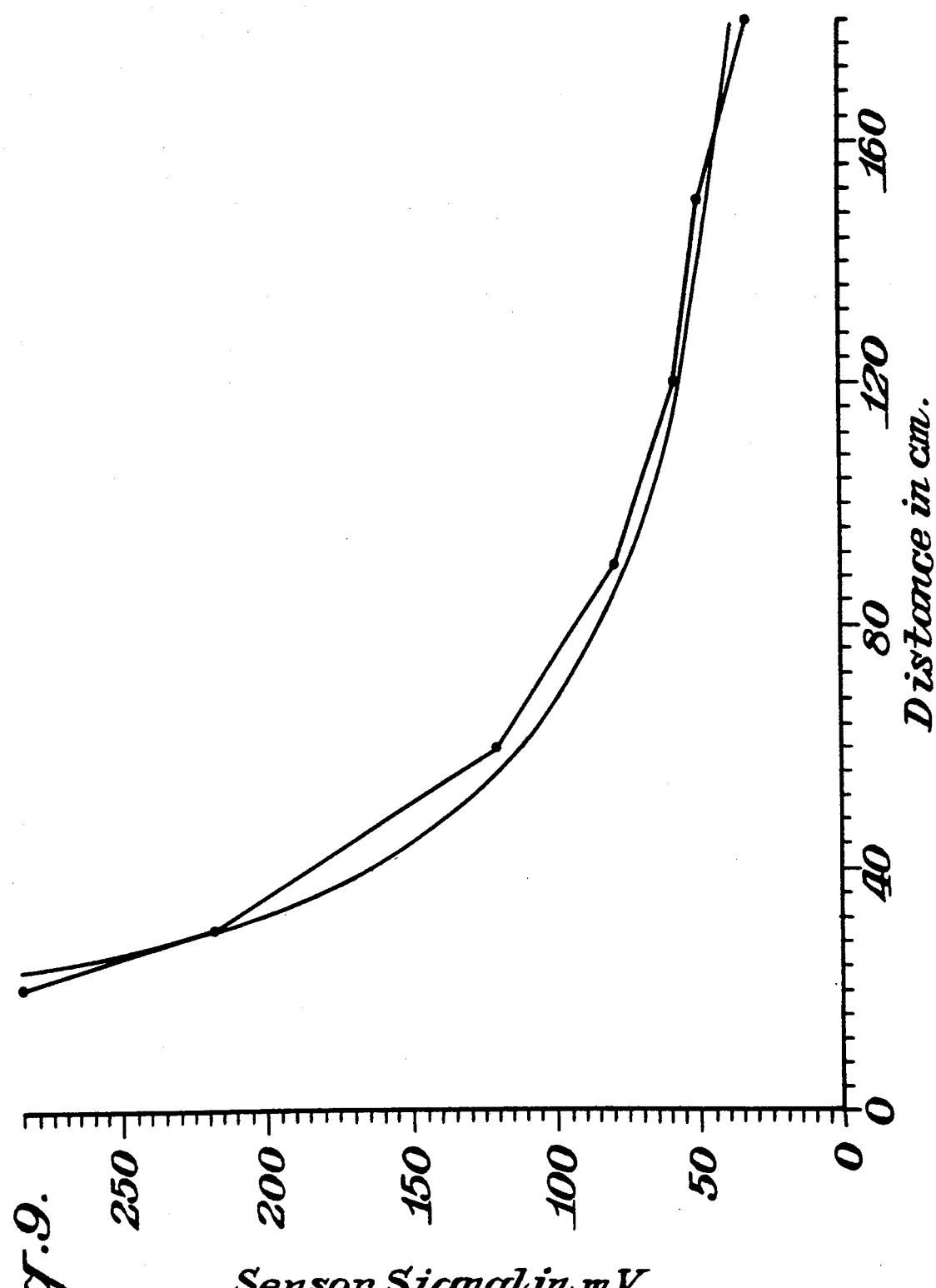
FIG. 9 is a plot of sensor signal in mV versus distance in cm for a sensor with a cylindrical geometry consisting of one fiber.

FIGS. 4 and 5 present the sensitivity of the POF-based sensor as a function of X-ray photon energy. Note that the sensitivity is presented in different units in the two figures. From FIG. 4 it is inferred that the quantum efficiency (defined loosely as the signal per incident photon) saturates at photon energies above 17.5 keV. Below this energy, the sensitivity is apparently limited as a result of x-ray absorption by the cladding layer over the luminescent screen. In FIG. 5, the sensitivity of the POF-based sensor is expressed in mVs/R. A dose rate of 1 R/s of 25 keV x-ray photons would produce a signal of 1V if the amplifier gain were set at $10^7$.

The POF-based sensor has a linear response to x-rays over a wide range of exposure rates at photon energies from 5 keV to 1.1 MeV. The sensitivity of the POF-based sensor increases dramatically between 5 and 25 keV, above which the sensitivity is more weakly dependent on x-ray photon energy. The width of the energy range applicable is dependent on the screens employed.

The following example shows that the instant sensor can even be employed up to energies of 1.1 MeV, so that the exposure rate of photon energies ranges then from 5 KeV to 1.1 MeV.

EXAMPLE 2

In this experiment the sensor signal intensity has been measured as a function of the distance to a (Co$^{60}$)-source (double source); activity=15 kCi and $\gamma$-energy=1.1 MeV.

Different geometries of the instant sensor have been tested.

1: sensor with a cylindrical geometry consisting of 2 fibers.
 $\phi$ (diameter) of the sensor 0.9 cm
2: sensor with a cylindrical geometry consisting of 20 fibers
 $\phi$ (diameter) of the sensor 0.9 cm
3: sensor with a plate-like geometry plate: 2.4×2.4 cm
4: sensor with a cylindrical geometry consisting of 1 fiber
 $\phi$ (diameter) of the sensor 0.9 cm Taking into account the double-source geometry, a very good $1/X^2$ dependence (x=distance of the sensor to the source) can clearly be seen for all four sensors even at energies as high as 1.1 MeV. The distance between the double source and the detector was greater than 15 meters in the experiments conducted.

Contrary to the prior art, with the sensors of the present invention no high voltage has to be applied. Moreover, the fibers can be employed several times at different energies contrary to those systems where the scintillation material is contained in the fibers. It is also noteworthy that the instant detector is small, compact and highly sensitive to radiation in a wide energy range.

The radiation detector 10 shown in FIG. 10 has several radiation absorbing panels 12 arranged parallel to one another. Optical waveguides 14 are positioned between the panels 12, and metal sheets 16 are positioned between the panels and waveguides, as shown. The metal sheets are made of metals having a high atomic number greater than 25, for example iron, copper or zinc. Preferred are metals having an atomic number greater than 40 such as zirconium, palladium, silver or cadmium, and most preferred are metals having an atomic number greater than 73 such as platinum, gold or lead. The thickness of the metal sheet is dependent upon the energies employed. Also, a cover 18 may be provided, if desired.

Possible multilayer structures may comprise:

a. — ... p—wg—p—ms—p—wg—p—ms—p ...

b. — ... p—wg—ms—mg—p—wg—ms—wg—p ...

c. — ... p—wg—ms—p—wg—ms—p ...

where p=panel 12, wg=waveguide 24, and ms=metal sheet 16.

With this detector 10 it is possible to determine x-ray- and $\gamma$-energies by absorption processes in the metal sheet and thereby to measure intensity ratios.

FIGS. 11 and 12 specifically illustrate a detector 20 having a cylindrical geometry wherein a bundle of fiber waveguides 22 are surrounded by a radiation absorbing layer in the form of a sleeve 24.

What is claimed is:

1. A detector for detecting invisible radiation and charged particles comprising at least one radiation-absorbing panel and at least one optical waveguide arranged parallel to the surface of the panel, and wherein:

(a) the at least one radiation-absorbing panel is a radiation-to-light converting material and is composed of a carrier material which is doped with a luminescent compound;
(b) the at least one optical waveguide is a fiber;
(c) the fiber is composed of a transparent polymer core and of a polymer cladding having a lower refractive index than the core material;
(d) the fiber contains at least one fluorescent dyestuff;
(e) the wavelength range emitted by the luminescent compounds of the at least one radiation-absorbing panel is overlapping with the wavelength range of the absorption of the fluorescent dyestuff; and
(f) an end of the fiber is reflection-coated.

2. A radiation detector as in claim 1 wherein the at least one optical waveguide includes a plurality of optical wavelengths arranged parallel to the at least one radiation-absorbing panel.

3. A radiation detector as in claim 1 wherein the at least one radiation-absorbing panel includes two radiation-absorbing panels with the panels arranged parallel to one another, and wherein the at least one optical waveguide is positioned between the parallel panels.

4. A radiation detector as in claim 3 wherein the at least one optical waveguide includes a plurality of optical waveguides positioned between the parallel panels.

5. A radiation detector as in claim 1 wherein the detector has a linear response over a wide range of photon energies from 5 keV to 1.1 MeV.

6. A radiation detector as in claim 1 wherein the detector has a linear response over a wide range of photon energies from 5 keV to 22.5 MeV.

7. A radiation detector as in claim 1 wherein the at least one radiation-absorbing panel includes a plurality of spaced apart radiation-absorbing panels arranged parallel to ne another and the at least one optical waveguide includes a plurality of optical waveguides positioned adjacent to each panel on one side of each panel, each radiation-absorbing panel and the adjacent optical waveguides on one side thereof forming a panel and waveguides unit, and metal sheets positioned between the panel and waveguides units, the metal sheets being formed of metal having an atomic number greater than 25.

8. A radiation detector as in claim 7 wherein the metal sheets are formed of metal having an atomic number greater than 40.

9. A radiation detector as in claim 7 wherein the metal sheets are formed of metal having an atomic number greater than 73.

10. A detector for detecting invisible radiation and charged particles comprising a radiation-absorbing sleeve and a bundle of optical waveguides arranged parallel to one another and within the sleeve, and wherein:
(a) the radiation-absorbing sleeve is a radiation-to-light converting material and is composed of a carrier material which is doped with a luminescent compound;
(b) the bundle of optical waveguides comprises a plurality of fibers;
(c) the fibers are each composed of a transparent polymer core and of a polymer cladding having a lower refractive index than the core material;
(d) each fiber contains at least one fluorescent dyestuff;
(e) the wavelength range emitted by the luminescent compound of the radiation-absorbing sleeve is overlapping with the wavelength range of the absorption of the fluorescent dyestuff; and
(f) an end of each fiber is reflection-coated.

* * * * *

UNITED STATES PATENT AND TRADEMARK OFFICE
CERTIFICATE OF CORRECTION

PATENT NO. : 5,281,820
DATED : January 25, 1994
INVENTOR(S) : Werner Groh et al

It is certified that error appears in the above-indentified patent and that said Letters Patent is hereby corrected as shown below:

Column 7, line 2, before the period insert -- Coulomb/kilogram --; and after line 4 (in the formula) change "$_{NS}$" to -- $_{N2}$ --.

Column 8, line 48 (in b.) change "mg" to -- wg --.

Column 9, line 36, (claim 7, line 4, change "ne" to -- one --.

Signed and Sealed this

Fifth Day of July, 1994

Attest:

BRUCE LEHMAN

*Attesting Officer*     *Commissioner of Patents and Trademarks*